United States Patent [19]

Novinger

[11] 4,304,222
[45] Dec. 8, 1981

[54] LOW PROFILE EVACUATED-BOTTLE SOLAR COLLECTOR MODULE

[76] Inventor: Harry E. Novinger, 4961 S. Chester St., Englewood, Colo. 80111

[21] Appl. No.: 179,227

[22] Filed: Aug. 18, 1980

[51] Int. Cl.³ .............................. F24J 3/02; F28D 7/06
[52] U.S. Cl. ................................... 126/443; 126/450; 165/176
[58] Field of Search ........................ 165/174, 176, 177; 126/442, 443, 448, 450

[56] References Cited

U.S. PATENT DOCUMENTS

| | | | |
|---|---|---|---|
| 3,759,319 | 9/1973 | Ritland | 165/176 |
| 4,016,860 | 4/1977 | Moan | 126/443 |
| 4,018,215 | 4/1977 | Pei | 126/443 |
| 4,080,954 | 3/1978 | de Wilde et al. | 126/443 |
| 4,091,796 | 5/1978 | Bieringer et al. | 126/443 |
| 4,120,285 | 10/1978 | Nugent | 126/443 |
| 4,126,121 | 11/1978 | Fairbanks | 126/443 |
| 4,150,662 | 4/1979 | Summers | 126/443 |
| 4,202,322 | 5/1980 | Delgado et al. | 126/438 |
| 4,223,722 | 9/1980 | Shade | 165/176 |
| 4,232,655 | 11/1980 | Frissora et al. | 126/450 |

Primary Examiner—Daniel J. O'Connor

[57] ABSTRACT

A low profile, light weight and economical evacuated-bottle solar collector module is described. A row of off-shelf high vacuumware bottles as used for soup or coffee, without their usual reflective silvering, are fitted with absorbers and have their open ends fixed in grooves for support and thermal insulation in a combination insulation-support carrying frame. Holes are adapted in the frame for passage of the heat transfer fluid. Additional insulation members form header ducts for an air transfer medium or provide insulation and support of liquid tight tubing for a liquid transfer medium.

7 Claims, 11 Drawing Figures

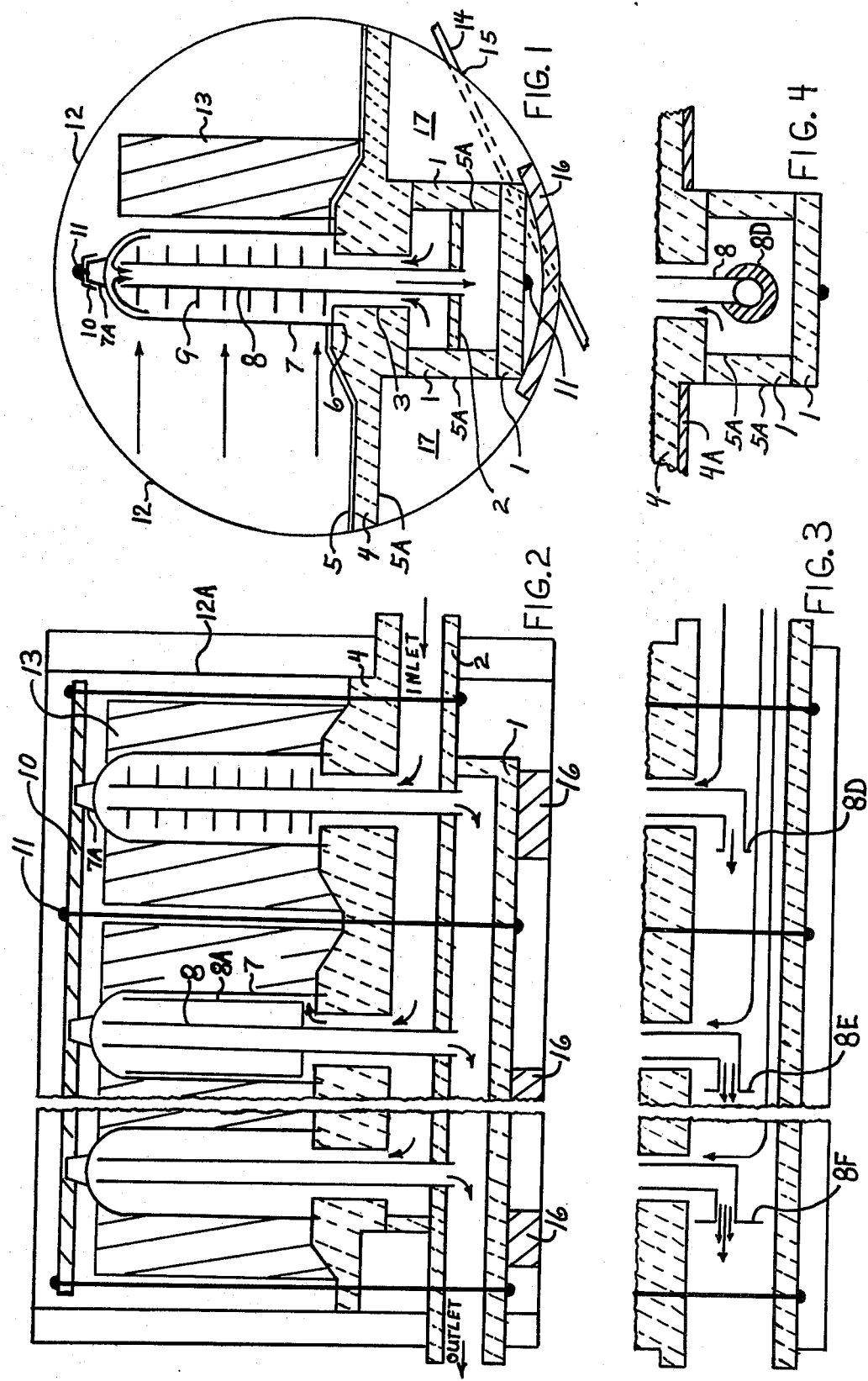

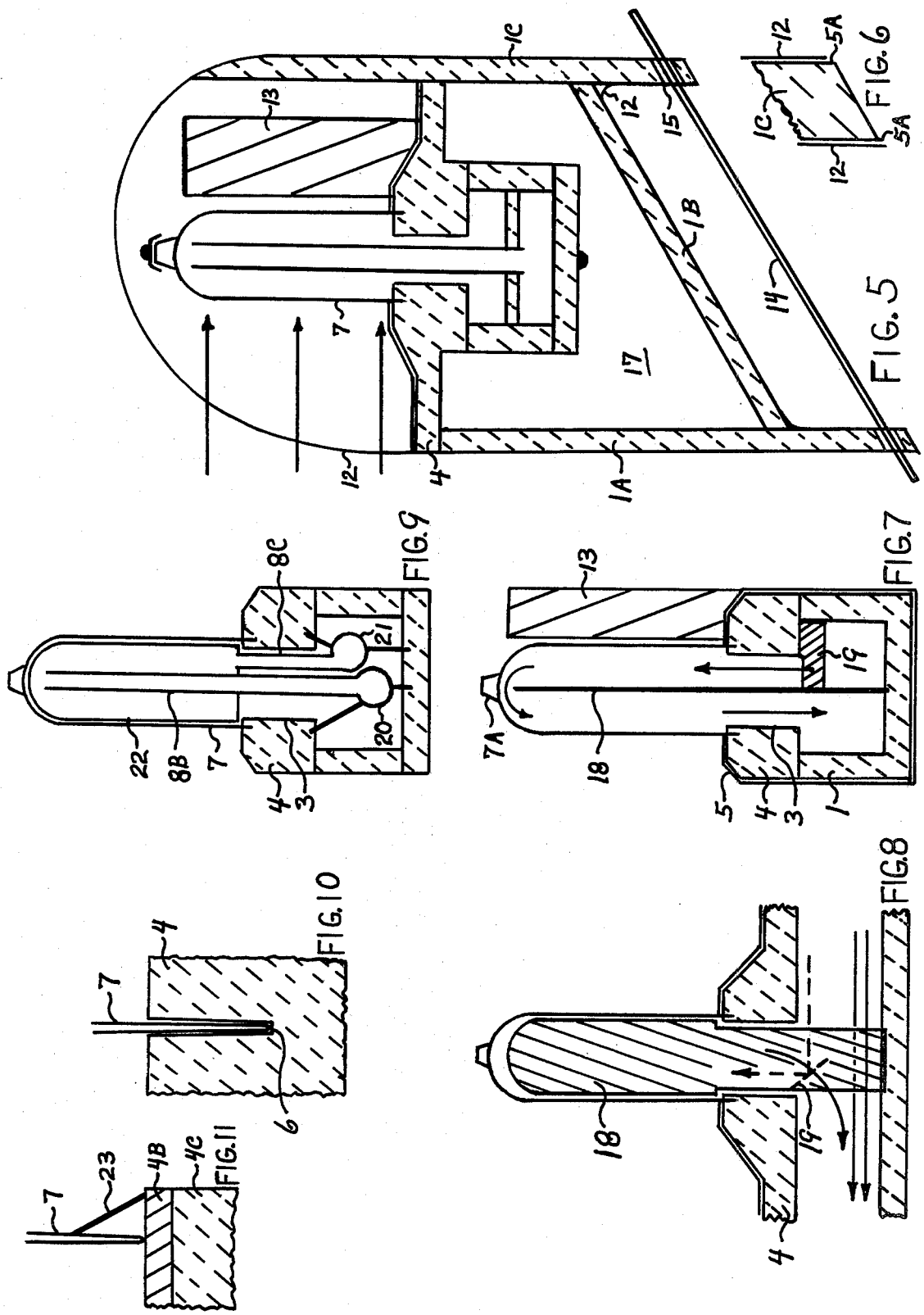

LOW PROFILE EVACUATED-BOTTLE SOLAR COLLECTOR MODULE

BACKGROUND OF INVENTION

The field of the invention relates to solar energy and particularly to evacuated-tube solar collector module construction using short off-shelf type vacuumwear bottles, without their usual reflective silvering, arranged in upright posture in rows on a carrying frame for their support.

The prior art uses long evacuated-tubes especially made for solar collectors. They are expensive and allow low profiles only when laid parallel to slanted roofs oriented to the south while this invention maintains low profiles when its collector bottles are arranged in upright tilt angles to roofs. This allows low profile module retrofits on east, south and west oriented roofs as well as on flat roofs. Known prior art does not suggest ducts formed of insulation material as this invention or provide for its abundant insulation. This invention is more economical than the prior art because: the top end of the short collectors need not be supported; the collectors can be off-shelf type vacuumware bottles; the liquid embodiment eliminates thermal shock breakage of the collectors that is common to the prior art; it provides standardized carrying frame and header duct insulation for both air and liquid heat transfer medium embodiments; and its housing cover and its hail proof covering may be of one easily wrapped-on sheet of glazing material. The prior art is not known to use its thermal insulation members to also support its collectors as this invention.

SUMMARY OF INVENTION

This solar collector module, in its air transfer medium embodiment, comprises a row of several off-shelf vacuumware bottles as its vacuum insulated collectors. Their mouths are further insulated by a deflector or by being inserted into grooves in their carrying frame when the frame is rigid insulation. Its carrying frame can totally support the bottles. This frame may also serve as the top member of the header duct system fixed below. The header ducts are also comprised of rigid insulation of economy and decreased weight. In the liquid transfer medium embodiment, tubing for ducts may be installed in the air version type header ducts and the voids about the tubes may be filled with additional insulation.

The inlet and outlet header ducts of both versions are in fluid communication with the bottle ducts. All bottle ducts penetrate the holes in the carrying board. The wide mouth shape of each bottle allows easy insertion of various pre-formed solar absorbers when the outer surface of the inner bottle or its inner surface is not coated as the absorber. A can equipped as the absorber is preferred in the liquid version. This low profile module can be easily mated with others to form arrays on all low pitched east, south and west roofs. Its light weight permits simple roof mounting. The wide mouth type soup bottle is preferred; however, the less wide mouth coffee bottle can be adapted to some of absorber embodiments herein.

The primary object of this invention is to provide simple solar collector modular structure for economical manufacture. The short length and relatively big diameter of each bottle does not require support bracing at its top closed end because it is fixed to its carrying frame by its mouth by tight fit or adhesive in a groove or by a combination clamp-deflector. Economy is also provided by combination glazing—covering that is wrapped over the entire module using one standard sized solar glazing fiberglass sheet where hail protection is required.

Another object is to provide increased operating efficiency by using abundant thermal insulation in addition of the vacuum insulation. The carrying frame and the header ducts are preferred to be of rigid insulation material, except in the liquid embodiment and this embodiment is also provided ample insulation. Increased efficiency also is provided through combination reflective—weather covering over the outer surface of the carrying frame and header duct system when a hail proof cover is not required. The efficiency is further increased by reflective surfaces on the inner and outer surfaces of the insulating members. The structural design allows lamination of these members for added reflective surfaces and strength.

Another object is to provide a low profile module for practical retrofit application on roofs not suitable or practical for mounting high profile type modules.

DESCRIPTION OF THE DRAWINGS

Other objects and advantages of the present invention will be apparent to those skilled in the art from the following description with reference to the appended claims wherein like numbers denote like parts and wherein:

FIG. 1 shows more or less a digrammic and schematic end view of a first bottle type collector looking down stream of an air transfer medium embodiment of this module wrapped in a cover of glazing material forming a cylinder;

FIG. 2 is a similar drawing of the side view of FIG. 1, broken to show both ends of the module while keeping the scale large. This drawing also shows the plurality of bottles, their ducts and header ducts in-parallel feed communication;

FIG. 3 is another side view broken at the carrying frame showing the air medium embodiment of FIG. 2 modified for combination inlet and outlet duct in-series feed communication;

FIG. 4 is the end view of FIG. 3 taken at flange 8D looking down stream;

FIG. 5 shows and end view of an embodiment similar in function to FIG. 1, but providing additional use of insulation boards 1;

FIG. 6 shows an enlarged view of the rear apron of FIG. 5;

FIG. 7 shows an end view module embodiment of an air medium module without hail covering, without top of bottle supports and employing in-series flow similar to FIG. 4 but with a different absorber member;

FIG. 8 is a side view of the embodiment of FIG. 7 and for clarity shows only one bottle of the plurality of bottles in the module;

FIG. 9 shows an end view of an embodiment similar to FIG. 7 modified for liquid transfer medium absorber duct and header duct arrangements;

FIG. 10 is an enlarged cross-section of the groove and bottle mouth in a section of an insulative carrying frame as seen in FIG. 7;

FIG. 11 is an embodiment showing a non-insulative carrying frame equipped with a combination air deflector-clamp used in lieu of the groove in FIG. 10.

DETAILED DESCRIPTION OF INVENTION

All views are at approximate reduced scale. FIGS. 1 and 2 show in-parallel air flow communication between the header ducts and the bottle type collectors. The inlet header duct is formed by insulation boards wall 1, center partition 2 and bottle carrying frame 4. The outlet header duct is formed by insulation boards wall 1 and wall 2. These boards are fixed to frame 4. The boards are not fully rigid; however, most types have considerable rigidity as do certain moulded insulations. They are commonly known as rigid insulation board, rigid insulation sheathing and duct board. Some are in wide use in lieu of metallic ducts.

Carrying frame 4 supports a plurality of bottles 7 arranged in a row and fixed in the top surface of 4. Being rigid insulation, the frame provides insulation for the mouths of the bottles also set in grooves 6 for fixing thereby providing the sole support for each bottle and part of the rigidity of the elongated module; the remaining rigidity is provided by the header ducts fixed below to the carrying frame.

Some insulation boards are made with reflective surfaces 5A on both sides. They also may be laminated for increased insulation and strength thereby providing for additional reflective surfaces. Booklet "Passive Design Ideas for the Energy Conscious Builder" by National Solar Heating and Cooling Information Center, states that tests using reflective surfaces on both sides of fibrous insulation shows improvement over one surface only.

Carrying board 4 is preferred to have higher quality reflective surface 5 for reflecting spurious light into the bottles. Portions of frame 4 define holes below the bottles for penetration by the bottle ducts. Cool air is routed from the inlet header duct to penetrate hole 3 around bottle duct 8 to flow to the top of the bottle then down outlet bottle duct 8 to communicate with the outlet header duct. The warm inner mouth wall of the inner bottle, of the vacuum bottle, rapidly loses heat through the common bond with the cool outer bottle wall; thus, groove 6 insulates this area of its mouth. Either one bottle wall or both may be insulated by tight fit in the groove as designed. As the air transfer medium flow proceeds upwardly, it is kept close to the absorbing wall of the inner bottle 7 by fins 9 or by expanded tube 8A in FIG. 2 for optional removal of heat. The long arrows in front of bottle 7 indicate beam direction passing through aperture glazing 12. Off-shelf vacuumware bottles, without their silvering, are preferred because of economy. They all have, at their closed ends, a cover 7A for protection of their welded vacuum pips. Pins 11 can be used to link bracket 10 to the bottom side of the header ducts as a method of convenient assembly fix when the bottles are not fixed in any other manner to frame 4. No linkage is necessary when the bottles 7 are fixed to the top of their carrying frame 4 by tight groove 6 fit or by adhesive.

High quality flexible solar glazing in standard widths is available for fully wrapping the module to form a cylinder that adds rigidity to the module and for a durable, light weight, economical and hail proof cover 12. End cover insert 12A may be the same or other material. Weep holes are not shown for clarity. Diffusing reflectors may be used behind the bottles; however, preferred are concentrating reflectors 13 to reflect heat into the bottles when the bottles are spaced apart as in FIG. 2. Rods 14 inserted through holes 15 in cover 12 provide for simple roof bracket mounting. Support 16 may be extended to meet and fix with both sides of carrying frame 4. Voids 17 may be filled with insulation as lack of insulation is a common problem with the prior art. All voids may be varied in size by changing the diameter of cylinder 12.

FIG. 2 provides a side view of the in-parallel duct system wherein all the bottle ducts communicate with the header ducts at equal flow rate. FIG. 2 is broken to save space and shows only the bottles close to the ends of the module. The second bottle from the right shows an alternate embodiment cylinder-like or expanded duct as 8A for routing the air close to the wall of the inner bottle as 9 in FIG. 1. When one of the surfaces of the inner bottle wall is not coated as the absorber, the surface of 8A may be coated as the absorber or have integral absorbing characteristics. A thick wrap of rock wool may also be wrapped about 8A and spaced from the bottle wall as a permanent absorber insert.

FIG. 3 is an embodiment of a combined inlet-outlet header duct with in-series communication with the bottle ducts. For example, flange 8D is of a size sufficient to cause a quantity of the inlet duct flow stream to seek the path of least resistance to flow through an heat in the first bottle and back into the header duct farther downstream to join the remainder of the cool inlet air that passed by the first collector. Flange 8D also creates low pressure following its flange assisting this flow through the solar collector bottle 7. Likewise, flange 8E functions similarly; except it is bigger to route a greater amount of air through its bottle ducts because some of the air stream here is already increased in temperature. Each absorber is capable for heating a quantity of air to the same temperature. For efficiency, 8E must direct more air into its bottle than does 8D because 8E air is of a higher temperature. Each flange located progressively farther down stream is also progressively bigger and feeds more air to its absorber. FIG. 4 shows an end view of FIG. 3 taken at flange 8D. It also shows carrying frame 4 braced by non-insulating member 4A when extra rigidity is required below insulative carrying frame 4.

FIG. 5 is an embodiment similar to FIG. 1, but includes additional use of insulating boards shown as 1A, 1B, and 1C. They are used here as combination insulating-braces. The header ducts are additionally insulated there and Cover 12 is backed for bracing at its flat areas. Internal bracing, using at least one additional board is not shown for clarity. Void 17 is filled with insulation.

FIG. 6 is a larger scale view of the rear apron of FIG. 5 to show cover 12 wrapped thereon. Cover 12 has no seams for water entry except at the ends which are inserted as shown in FIG. 2 as 12A. Prior art seals are expensive, non permanent and often leak.

FIG. 7 and FIG. 8 show this invention's basic structural members in a simplified module embodiment for use where a hail cover is not required. This embodiment, however, requires carrying frame 4 and the below fixed header duct to be water protected by extending the high quality reflective cover 5; cover 5 here may be another suitable cover as the top area of frame 4 is small in this embodiment and being covered with a reflective surface adds little gain in heat. Insulation boards 1 have reflective surfaces beneath cover 5. This embodiment also varies as to its absorber 18 and bottle ducts although it is of the air in-series heat transfer medium version similar to FIGS. 3 and 4. Absorber plate 18 is coated or has integral absorbing qualities. It extends into the combination inlet-outlet header duct to divide the header duct air stream, to support deflector 19 and to assist this deflector to control in-series air communication through its respective bottle ducts formed by frame holes 3, bottles 7 and absorber 18.

Deflectors 19 vary in size or angle to the air stream to deflect a progressively increased volume of air into each bottle for the same reasons as described above for FIG. 3. The bottles here are supported entirely by carrying board 4 as earlier described as a choice in the FIG. 1 description.

FIG. 8 is a side view of FIG. 7, broken to show only one collector bottle of the plurality of bottles in the module.

FIG. 9 is an end view of a liquid heat transfer medium module. The carrying frame 4, with its holes, and the air version in-series header duct structures of FIG. 7 provide convenient and practical structures for simple modification to liquid medium operation. Inlet duct 20 and outlet duct 21 are located to run parallel below frame 4. They may be fixed to frame 4 or to board 1 as shown. Inlet header duct 20 is connected to bottle duct 8B which penetrates hole 3. Outlet header duct 21 is connected with bottle duct 8C which also penetrates hole 3. Bottle duct 8B extends close to the top of can 22 for efficient filling. This duct 8B structure is also required for draining can 22 when the entire module is operated in an inverted posture; when inverted, ducts 20 and 21 exchange functions. Can 22 may have coated or integral absorption characteristics. A metal can is preferred. Evacuated-tube collectors having absorber glass walls experience thermal shock during rapid filling that often results in breakage of the collector tubes. One of the main purposes of this embodiment is the elimination of this common deficiency by providing an unbreakable can wall which the coal liquid contacts. This embodiment may also receive covering 12 of the other version of this invention. Rear located reflectors 13 and cover 5 of FIG. 7 may be adopted.

FIG. 10 is an enlarged view of one side of the inner and outer walls of bottles 7 showing their common bond at the mouth and their insulation by tight fit with groove 6 of carrying frame 4.

FIG. 11 is an enlarged view of the mouth walls of bottles 7 showing an inner wall insulated from the air flow by combination air deflector-bottle support member 23. Support 23 is a sleeve in fixed contact with the bottle by friction or adhesive and in contact with carrying frame 4B by any conventional fixing manner. Deflector-support 23 may be used when the carrying frame is comprised of non-insulative top 4B above an insulative member 4C in lieu of the usual insulative frame 4.

While the invention has been described and shown in its preferred embodiments, it will be clear to those skilled in the arts to which it pertains that many changes and modifications may be made thereto without departing from the scope of the invention.

I claim:

1. An evacuated-bottle solar collector module comprising;

a row of vacuum insulated bottles having one mouth each;

absorber means associated with the bottles for heat absorption and the absorber means for each bottle comprises a plate absorber approximately parallel the axis of the bottle, extending approximately through the length of the bottle, through its respective frame hole and into the combination inlet-outlet header duct ending in a down stream direction;

a carrying frame having portions defining holes, the frame disposed beneath the bottles and carrying the bottles in spaced relation in grooves in its top surface centered about its holes, the carrying frame further comprised of rigid insulation, at least one surface of each bottle mouth additionally insulated and fixed by each groove, and the carrying frame having at least one surface reflective;

means for fixing the bottle mouths to carrying frame for bottle support;

header duct means fixed beneath the carrying frame for passage of a heat transfer fluid into and out of the module and this means having ducts comprised of rigid insulation, at least one surface reflective and comprising a combination inlet-outlet duct;

bottle duct means associated with the carrying frame holes, the bottles and the absorber means for ducting the heat transfer fluid into and out of the bottles, the bottle duct means for each bottle having two ducts and a portion of one formed by the hole in the carrying frame and further comprising an air deflector between one side of the plate and one side of the combination inlet-outlet duct for directing a quantity of the header duct air stream into the bottle ducts, each deflector next down stream progressively larger than the one next up stream for progressively increasing an in-series controlled quantity of air to flow through each respective located bottle;

means for fluid tight communication between the header duct means and the bottle duct means; and, reflector means spaced behind the bottles and fixed for support to the carrying frame for reflecting heat into the bottles.

2. An evacuated-bottle solar collector module comprising;

a row of vacuum insulated bottles having one mouth each;

absorber means associated with the bottles for heat absorption;

a carrying frame having portions defining holes, the frame disposed beneath the bottles and carrying the bottles in spaced relation in grooves in its top surface centered about its holes, the carrying frame further comprised of rigid insulation, at least one surface of each bottle mouth additionally insulated and fixed by each groove and having one surface reflective;

means for fixing the bottle mouths to the carrying frame for bottle support;

header duct means fixed beneath the carrying frame for passage of a heat transfer fluid into and out of the module and this means having ducts comprised of rigid insulation, at least one surface of the header ducts reflective and comprising a combination inlet-outlet duct;

bottle duct means associated with the carrying frame holes, the bottles and the absorber means for ducting the heat transfer fluid into and out of the bottles, the bottle duct means for each bottle having two ducts and a portion of one formed by the hole in the carrying frame and further having the portion of one of its ducts that is within its respective bottle of a size approximately the volume of the bottle and equipped with absorbing characteristics, a lower portion of this duct extending into and in direction of the header duct air stream, the lower end of this bottle duct having a deflector across the header duct stream for directing a quantity of the header duct air stream into the bottle ducts, each deflector down stream progressively larger than the one next upstream for progressively increasing an in-series controlled quantity of air to flow through each respective bottle;

means for fluid tight communication between the header duct means and the bottle duct means; and reflector means spaced behind the bottles and fixed for support to the carrying frame for reflecting heat into the bottles.

3. The invention of claim 1 or 2, wherein; the header duct means further comprises inlet and outlet ducts, the bottle duct means for each bottle further comprises inlet and outlet ducts, and the carrying frame having at least one surface reflective.

4. The invention of claim 3, wherein; additional rigid insulation behind the carrying frame and enclosing the header ducts and flexible glazing applied over the additional insulation and covering the plurality of bottles, the spaced reflectors and carrying frame.

5. The invention of claim 3, wherein; flexible glazing applied in cylindrical shape around the plurality of bottles and the spaced reflectors, the carrying frame and the header ducts, and means for enclosing the ends of the cylinder.

6. The invention of claim 1 or 2, wherein; the carrying frame comprising a rigid member, the inner wall of each bottle mouth is further insulated by an air deflector positioned within its mouth, the deflector fixing the bottle for support to the carrying frame, the header duct means comprised of rigid insulation disposed beneath the carrying frame, at least one surface of the header duct means reflective, the carrying frame upper surface reflective, and the bottle duct means of each bottle having two ducts and a portion of one formed by its respective hole in the carrying frame.

7. The invention of claim 1 or 2, wherein; the bottle duct means for each bottle having an inlet duct and an outlet duct and one of the ducts having a portion comprising a can with absorber characteristics, the can occupying substantially all the volume of the bottle, the absorber means comprising the can portion of the one duct, the header duct means further comprising inlet and outlet ducts, the fluid tight means between the header duct means and the bottle duct means being liquid tight, the carrying frame comprising rigid insulation means fixed below for enclosing and insulating the header ducts, at least one surface of the rigid insulation means reflective, and the carrying frame having a groove for each bottle in its surface for fixing the bottle.

* * * * *